United States Patent Office 3,194,486
Patented July 13, 1965

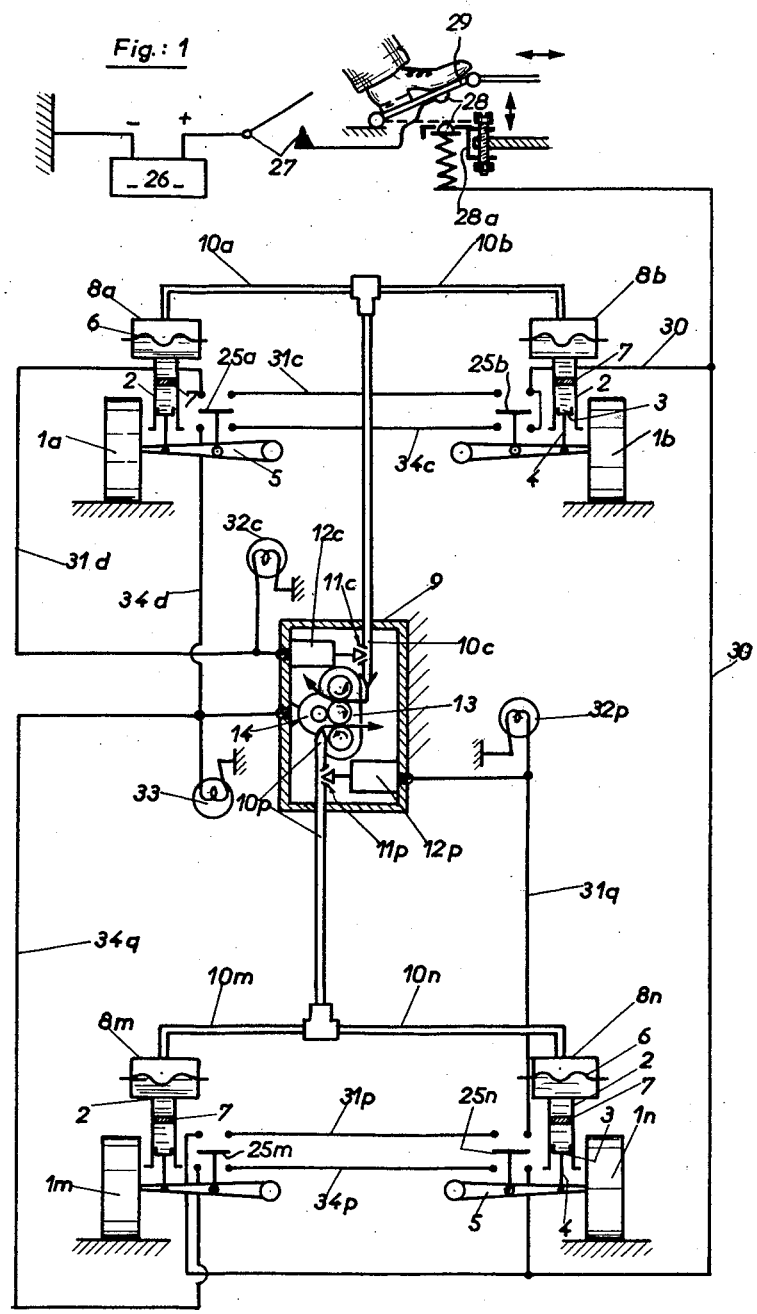

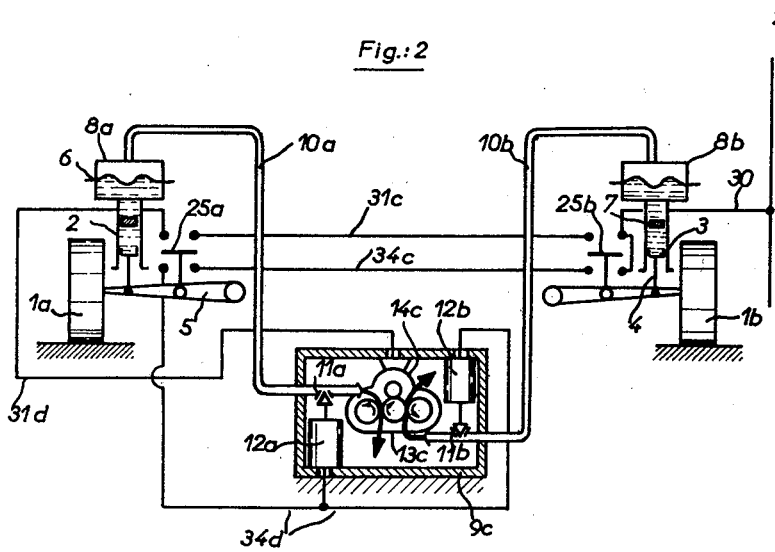
Fig.: 2
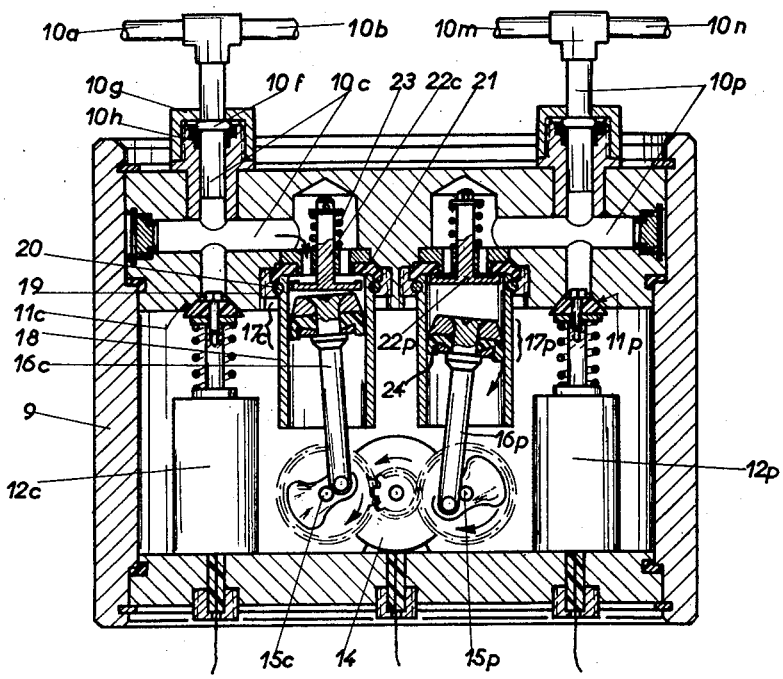
Fig.: 3

3,194,486
MOTOR AND COMPRESSOR SET APPLICABLE, IN PARTICULAR, TO PNEUMATIC SUSPENSION SYSTEMS
Fernand Stanislas Allinquant, 53 Ave. Le Notre, Sceaux, Seine, France
Filed Nov. 29, 1963, Ser. No. 326,958
Claims priority, application France, Dec. 5, 1962, 917,636
3 Claims. (Cl. 230—58)

The invention relates to an improved motor and compressor set which is applicable, in particular, to pneumatic suspension systems.

In my U.S. specification No. 2,987,312, which latter is of even date with the present specification, there is described an improved oleopneumatic suspension of closed type, containing a gas of variable mass and pressure which is distributed by transfer means between, on the one hand, the suspension elements proper, which contain an operative part of the gas, and, on the other hand, a reservoir containing the remainder of the gas, which is inoperative. Such a suspension system comprises height-detecting means which are simple electrical contacts actuated by the guide arms of the wheels and connected electrically to the transfer means controlled thereby, which latter are advantageously located in the reservoir of inoperative gas.

The present invention has for its object an electrically fed motor and compressor set which is particularly, but not exclusively, applicable to such suspension systems and which, in the case of such application, constitutes one of the transfer means, the others, of which there may be more than one, being electric valves whose rate of delivery is preferably greater than that of the compressor.

This motor and compressor set is of the type which employs pistons. It may comprise a plurality of cylinders respectively associated with pistons which are driven by a common motor and regularly de-phased in their relative movements, these cylinders each having a separate inlet duct and the pistons being fixed to the end of their respective rods in such manner as to be able to oscillate during the displacement of the piston rods.

Each oscillating piston is provided with a cup type sealing joint having a lip turned over in the direction towards the associated piston rod, in such manner as to allow the gas compressed by the piston to escape below it. An automatic spring-biased inlet valve is disposed above the piston and bears on a packing which serves to seal the cylinder. Finally, this packing, which in its central portion is fast with the casing defining the cylinder and is also fast at its periphery with a fixed member which performs the function of a cylinder head and on which the inlet valve is mounted, is subjected to a shearing stress which produces sealing tightness thereof during the axial movement accompanying the fitting of the cylinder-casing.

This method of achieving sealing-tightness by the axial shearing stress applied to an elastic packing may, moreover, be applied to several other packings included in the compressor.

The description which follows, with reference to the accompanying drawings, and which is given by way of non-limitative example only, will enable the various features of the invention and the manner of carrying them into effect to be clearly understood. In the drawings:

FIGURE 1 is a diagram of an oleopneumatic suspension system employing a variable volume of gas and embodying the invention;

FIGURE 2 is a diagram of a modified constructional form of suspension system, and FIGURE 3 shows, in greater detail, the construction of the transfer device which is incorporated in the suspension system and which comprises at least one electric valve and an improved motor and compressor set.

Referring to FIGURES 1 and 2, the oleopneumatic suspension with automatic level correction which is shown therein comprises, in association with each wheel 1, a suspension element forming a jack, each said jack being constituted, with advantage, by a cylinder fast with the vehicle-body and by an oscillating piston 3, the rod 4 of which is articulated to an arm 5 carrying the wheel 1. A flexible diaphragm 6 separates the liquid contained in the jack from a mass of compressed active gas which acts as a spring, a partition 7 provided with calibrated passages serving to damp the movements of the liquid.

The chamber 8 associated with each jack contains the diaphragm 6 and is connected by a pipe 10 to a casing 9 which forms a reserve of inoperative gas under pressure and which contains transfer means causing the said gas to pass from the casing 9 to the chamber 8 and vice versa. In FIGURE 1, the two chambers 8a and 8b associated with the jacks appertaining to the wheels 1a, 1b of the front axle, are connected to the casing 9 by a T-shaped pipe 10, the common branch 10c of which is extended within the casing and carries a seat 11c for an electric valve 12c, before terminating in a connection with a compressor 13. Likewise, the chambers 8m and 8n appertaining to the rear axle are connected to the casing 9 by a second T-shaped pipe, the common branch 10p of which is extended within the casing and carries a seat 11p for an electric valve 12p, before terminating at the compressor 13.

FIGURE 2 shows a modified constructional form comprising one electric valve 12a, 12b for each wheel and one compressor for each axle, 13 for example, all the transfer means connected with the same axle being housed in the same casing, the casing 9c for example.

In order to simplify the drawings, the compressor 13, which is, in fact, a piston-type compressor driven by an electric motor 14, has been represented in FIGURE 1 purely diagrammatically, as a pump consisting of double gear wheels. The true construction of the compressor is made clear in FIGURE 3.

In FIGURE 3 there can be seen a compressor 13 having two cylinders which are each provided with an independent inlet duct 10p or 10c but which are exhausted into the interior of the casing 9 which contains, in addition to the compressor 13 and its electric motor 14, two electric valves 12c, 12p connected in by-pass arrangement to the respective cylinders.

Through the medium of a pair of step-down gears, the motor 14 drives two crankshafts 15c, 15p, which are keyed on their respective shafts at an angle of 180° relatively to one another, so as to regularize the resistive moment provided by the pistons. Each crankshaft 15c or 15p drives in turn the rod 16c or 16p of a piston 17c or 17p which oscillates and slides in a cylinder casing 18 held in position by an externally threaded ring 19 which is screwed into place and bears on a securing ring 20. The casing 18 bears on a sealing packing 21 also serving as a bearing surface for a valve 22c or 22p which is biassed closed by a spring 23 and occupies substantially the whole cylinder section to provide a cup type sealing joint. Each piston 17c or 17p has a flexible lip such as 24, directed away from the piston towards the piston rod 16c or 16p. This method of construction enables the dead capacity of the cylinder to be reduced to a very low value and the valve follows the movements of the piston very closely.

There will also be noted in FIGURE 2, the systematic use, in order to achieve good sealing-tightness to the compressed gas, of rubber packings each gripped between two members which impose a shearing stress on the packing in at least one zone. For example, the screwing-in of the threaded ring 19 which, by means of the securing ring 20, is rendered axially fast with one of the cylinder casings 18, subjects the corresponding packing 21, which is flat in the free unstressed state, to a shearing stress between the end of the said casing and an annular rim of the cover of the casing 9 which closes the cylinder, this rim being outside the casing 18. Likewise, in conjunction with the outlet of the pipe 10c, for example, the end of which simply comprises a standard shoulder 10f, there is employed a rubber packing which is of rectangular medial cross-section when unstressed but which the tightening of the bush 10g causes to be extruded, on the one hand around the shoulder 10f and, on the other hand, into a bore 10h of small depth surrounding the end of the pipe 10c.

The suspension shown in FIGURES 1 and 2 has thus been described in detail as regards its mechanical construction, which is particularly noteworthy by reason of the method of construction of the compressor. The suspension is completed by an electrically controlled level correcting system which operates with an intermittent power supply derived from an electric source 26 by way of a switch 28 connected to the accelerator pedal 29. The level correcting system also includes three-position height correctors 25a, 25b, 25m and 25n, the correctors for each axle being arranged in series and connected to the motor 14 and to the electric valves 12. Indicator lamps 32, 33 keep the driver informed of the operation of the transfer means 12 and 13.

It will be seen that one of these means, the compressor 13 for example, operates only when the switch 28 and the two height correctors 25 connected to the same axle (the correctors 25a and 25b, for example) are simultaneously closed, the movable switch-elements of the two correctors being located in the lower position, which corresponds to a too large ground clearance of the vehicle at the position of the front axle. The compressor then draws gas from the pipes 10a, 10b and stores it in the casing 9 under a pressure higher than that prevailing in the suspension elements 8. The descent of one of the pistons 17 of the compressor causes the opening of the associated valve (as shown at 22c, for example) and allows the entry of the operative gas coming from the suspension elements 8 into the cylinder in question. When a piston 17 ascends, the valve associated with it closes again (as shown at 22p, for example), the compressed air escaping around the piston by temporarily deflecting the flexible lip 24. It will immediately be seen that this form of construction has the double advantage of reducing the dead capacity of the cylinder above the piston to the minimum and of giving a relatively large flow cross-section for the gas at the periphery of the valve.

The movement of the vehicle which occurs when the compressor operates to reduce the ground clearance may be relatively slow and the rate of delivery of the compressor less than that of an electric valve 12. However, in the case of FIGURE 1, the fact that the front and rear ground clearances vary simultaneously is not of great importance, since the electric valve associated with the axle which has not effected starting of the compressor (the valve 12p in the case shown in the drawing) rapidly nullifies any undesirable variation produced in the ground clearance at the position of this latter axle, if this proves to be necessary.

It is obvious that the compressor described above may also form part of a purely pneumatic suspension, that it may comprise a number of cylinders other than two and that inlet ducts common to a plurality of cylinders may be provided. Finally, there is nothing against the compressor being used for transferring a liquid rather than a gas and its field of application may possibly be wider than that of the vehicle-suspensions.

What is claimed is:

1. In combination with a gas-tight reserve casing filled with pressurized gas, said casing having an end plate in which is bored at least one delivery duct communicating with the inside of said casing and an electrovalve located within said casing normally closing said duct, an electrically actuated piston compressor comprising a threaded blind bore machined in said end plate inside said casing, an externally threaded cylinder positioned within said threaded bore, a bottom wall positioned within and spaced from the blind end of said threaded bore, an annular seal of elastic material, said seal being fastened at its outer periphery between the bottom wall and the threaded end of said cylinder, an inlet spring-biased poppet-valve mounted on said bottom wall and bearing on the inner periphery of said annular seal, said poppet-valve normally preventing gas from flowing out of said cylinder into said delivery duct, a piston, a cup-type seal, said seal being mounted on said piston so as to constitute an outlet valve allowing gas to flow from said cylinder into said casing when compressed by said piston, and electrically actuated means for reciprocating said piston within said cylinder.

2. The combination according to claim 1, wherein a connecting rod is operatively connected at one end to said piston of the compressor, a crankshaft, said connecting rod being operatively connected at the other end to said crankshaft, and an electrical motor located inside said casing and operatively connected for driving said crankshaft.

3. A compressor according to claim 1, wherein an annular rim is provided in the bottom wall of said blind bore and at the outer periphery thereof, the internal diameter of said rim being substantially the same as the outer diameter of said cylinder whereby the fixation of said cylinder on said end plate results in partial and local shear stress in said annular seal.

References Cited by the Examiner
UNITED STATES PATENTS

| | | | |
|---|---|---|---|
| 1,331,233 | 2/20 | Bery | 230—191 |
| 1,415,852 | 5/22 | Van Horn | 230—184 |
| 1,467,445 | 9/23 | Meyers et al. | 230—191 |
| 1,577,229 | 3/26 | Haddaway | 230—191 |
| 2,023,466 | 12/35 | Crowley | 230—190 |
| 2,984,406 | 5/61 | Chausson | 230—191 |

LAURENCE V. EFNER, *Primary Examiner.*

ROBERT M. WALKER, *Examiner.*